(12) United States Patent
Green et al.

(10) Patent No.: US 6,549,848 B1
(45) Date of Patent: *Apr. 15, 2003

(54) INTEGRATED POSITION AND DIRECTION SYSTEM WITH SKYPLOT

(75) Inventors: Jim Green, Los Altos Hills, CA (US); Richard Williams, West Melton (NZ)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/801,992

(22) Filed: Mar. 7, 2001

Related U.S. Application Data

(63) Continuation-in-part of application No. 09/614,392, filed on Jul. 12, 2000, now Pat. No. 6,353,798.

(51) Int. Cl.[7] ............................................. G01C 21/02
(52) U.S. Cl. ................................... 701/213; 342/357.15
(58) Field of Search ............................... 701/213, 214, 701/226; 342/357.06, 357.15

(56) References Cited

U.S. PATENT DOCUMENTS

| | | | | |
|---|---|---|---|---|
| 4,599,620 A | * | 7/1986 | Evans ................... | 342/357.11 |
| 5,572,217 A | * | 11/1996 | Flawn ................... | 342/357.08 |
| 5,812,932 A | * | 9/1998 | Wiedeman et al. .......... | 342/352 |
| 6,272,316 B1 | * | 8/2001 | Wiedeman et al. ......... | 455/12.1 |

OTHER PUBLICATIONS

Bester, M.; SatTrack (V4.0)—a real–time satellite tracking and orbit prediction program; Aerospace Applications Conf.;Feb. 1996; vol. 4, pp. 177–191.*

* cited by examiner

*Primary Examiner*—Michael J. Zanelli
(74) *Attorney, Agent, or Firm*—Wagner, Murabito & Hao LLP

(57) ABSTRACT

An integrated position and direction system is disclosed that includes a digital compass and a satellite positioning system having a receiver adapted to receive satellite position determining signals. Signals that are received from satellites are used to determine position of the integrated position and direction system. The orientation of the satellites relative to the determined position and relative to the orientation of the integrated position and direction system is then determined. In one embodiment, direction determined using the digital compass is used to determine the orientation of the satellites relative to the determined position and relative to the orientation of the integrated position and direction system. Alternatively, heading is used to determine the orientation of the satellites relative to the determined position and relative to the orientation of the integrated position and direction system. In one embodiment the direction of movement or "heading" determined by the SATPOS is used to orient the displayed skyplot when the SATPOS is moving, and the direction given by the digital compass is used to orient the displayed skyplot when the SATPOS is not moving.

20 Claims, 19 Drawing Sheets

1400

1410

1410

HEADING
1402

1411

1410

1410

1410

INTEGRATED POSITION AND DIRECTION SYSTEM WITH SKYPLOT

CROSS REFERENCE TO RELATED APPLICATION

This Application is a Continuation-in-Part of co-pending, commonly-owned U.S. patent application Ser. No. 09/614,392, filed Jul. 12, 2000 now U.S. Pat. No. 6,353,798, by J. Green et al., and entitled "INTEGRATED POSITION AND DIRECTION SYSTEM WITH THREE-SENSOR DIGITAL COMPASS".

TECHNICAL FIELD

This invention relates to position determination systems. Specifically, the present invention relates to an apparatus and a method for indicating a skyplot.

BACKGROUND ART

Satellite positioning system (SATPOS) devices that determine position using the satellites of the US Global Positioning System (GPS) are commonly used for navigation of vessels, vehicles, airplanes, and other conveyances. SATPOS devices are also used for surveying, construction site planning and management, mining, oil and gas exploration and development, etc. Also, handheld SATPOS devices are used for personal navigation, data collection, data maintenance, etc.

SATPOS devices are quite effective for indicating the position of the SATPOS device. Position is typically indicated using either an alphanumeric indication of position or by displaying a map that indicates position. Alphanumeric indications of position typically include coordinates such as, for example, Latitude and Longitude, World Geodetic Survey (WGS) Coordinates, etc.

Map displays typically indicate position by an icon or other indicator visible on a map. One such map display, typically referred to as a moving map display, displays the position of the SATPOS in the center of the displayed map. Such map displays typically are oriented such that the top of the SATPOS device's display indicates North (either magnetic North or true North). That is, irrespective of the direction in which the SATPOS device is actually oriented, North is shown at the top of the display. For users that intuitively know which direction is North, such maps are adequate for locating features displayed on the map. However, for users that do not know where North is, or when visibility is obscured such that the user cannot determine where North is, such maps are inadequate for guiding the user to a destination or feature on the map.

For many commercial applications of SATPOS systems, such as construction site planning and management, surveying, navigation, etc., it is essential that an operator be able to locate features displayed on the map. Such users typically operate a separate device for indicating direction such as a conventional magnetic compass.

Some SATPOS devices indicate the direction of movement of the SATPOS device, typically referred to as "heading." Typically, heading is determined by analysis of determined position in relation to prior determinations of position as the SATPOS moves. Typically, SATPOS devices that indicate heading use a map display oriented such that the top of the SATPOS unit (e.g., the top of the unit's display) corresponds to North(either magnetic North or true North). Some prior art SATPOS devices orient the displayed map such that the top of the SATPOS unit (e.g., the top of the unit's display) corresponds to the direction of movement calculated by the SATPOS device. This gives a good approximation of the user's heading as long as the user continues to move and as long as the SATPOS unit is oriented in the direction of movement, allowing a user to easily determine the location of features visible on the display.

However, when the SATPOS device stops moving, determination of heading can no longer be made. Some SATPOS systems maintain the previous heading for orienting the moving map display for a given time interval. Other prior art SATPOS systems default to positioning North at the top of the map. This can be quite confusing to the user.

Recently, digital compasses have been developed that can indicate direction. However, digital compasses must be calibrated to properly align the digital compass prior to use. Also, each time that magnetic environment around the compass changes, the digital compass must be recalibrated. Digital compasses are typically calibrated by moving the digital compass in a full horizontal arc. The calibration process takes time and is prone to operator error. Also, calibration error can occur as a result local magnetic anomalies.

Some SATPOS devices calculate and display the relative positions of each of the satellites from which signals are being received. These displays are commonly referred to as skyplots. Skyplots are important for indicating the number and relative location of satellites. This allows a user to determine when an obstruction such as, for example, a mountain, tall building, tree, etc., is blocking reception of satellite signals. By visually analyzing the relative locations of the received satellites, the user can move in order to optimize the number of satellites being received and the geometry relating to the received satellites. This allows for more accurate determination of position by moving so as to avoid the obstruction.

However, skyplots conventionally are displayed such that north is at the top of the display. Therefore, unless the user is able to determine which direction is North, the user cannot determine the relative direction from which satellite reception is blocked. Thus, in order to effectively use a skyplot, the user must typically operate a separate device for indicating direction such as a conventional magnetic compass.

What is needed is a method and apparatus for providing an accurate indication of heading to a user of a SATPOS device. Also, a method and apparatus is needed that meets the above needs and that accurately indicates direction when the SATPOS is not moving. Also, a method and apparatus is needed that is easy to use and that does not require a user to manually calibrate a compass. Moreover, a method and apparatus for generating a skyplot is needed that indicates the orientation of the satellites of a skyplot such that the location of the satellites can be easily determined by a user. The present invention meets the above needs.

DISCLOSURE OF THE INVENTION

The present invention provides a method and apparatus that accurately indicates direction and heading to a user of a satellite positioning system (SATPOS) device. The integrated position and direction system of the present invention includes a digital compass for indicating direction when the SATPOS is not accurately determining direction.

An integrated position and direction system is disclosed that includes a SATPOS having a receiver adapted to receive satellite position determining signals. The integrated position and direction system of the present invention also includes a digital compass that is adapted to determine direction.

The integrated position and direction system also includes a controller for controlling the operations of the integrated position and direction system. The controller is coupled to the SATPOS, the digital compass, and to a display.

In one embodiment of the present invention, when the SATPOS is moving, the direction of movement or "heading" determined by the SATPOS is indicated on the display. When the SATPOS is not moving, the direction given by the digital compass is indicated on the display. Therefore, while the SATPOS is moving, the heading is indicated, and when the SATPOS is not moving, direction is indicated using the digital compass. Thus, the present invention provides a method and apparatus for providing an accurate indication of both heading and direction to a user of a SATPOS device.

In one embodiment, the digital compass is automatically calibrated by the SATPOS when the SATPOS is moving. This calibration can be initiated by the user or can be fully automatic. More particularly, the digital compass of the present invention is calibrated automatically, either as a result of user input (e.g., selection of an icon, pressing of a button, etc.), or as a result of user-defined criteria for automatic calibration. That is, the user can program the present invention to automatically calibrate the digital compass (e.g. when velocity exceeds a given threshold, whenever the SATPOS begins moving, periodically while the SATPOS is moving, when the difference between the SATPOS determined heading differs from the heading indicated by the digital compass by more than a predetermined threshold, etc.) Thus, the position and direction system of the present invention is easy to use because there in no need for a user to calibrate a compass as is required using a prior art compass alone.

In one embodiment a method and apparatus for generating a skyplot is disclosed. In one embodiment of the present invention, the satellites of the skyplot are oriented according to the orientation of the integrated position and direction system. Thus, no matter what the orientation is of the position and direction system, the skyplot is properly oriented such that the user can easily determine the location of the satellites of the skyplot. In addition, when the orientation of the position and direction system is changed, the skyplot rotates such that the correct orientation of the satellites of the skyplot is always indicated relative to the orientation of the position and direction system.

In another embodiment of the present invention, the skyplot is oriented using both the heading determined by the SATPOS and using the direction determined by the digital compass. In this embodiment, when the SATPOS is moving, the direction of movement or SATPOS is not moving, the direction given by the digital compass is used to orient the displayed skyplot. Because the skyplot is always oriented relative to the integrated position and direction system, either based on the direction indicated by the digital compass or based on the movement of the integrated position and direction system, the user can easily determine the location of satellites of the skyplot. Also, the user can easily determine features that are obstructing satellite reception without any need for the user to determine the location of North as is required when using a prior art skyplot display.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as to not unnecessarily obscure aspects of the present invention.

Figure 1:
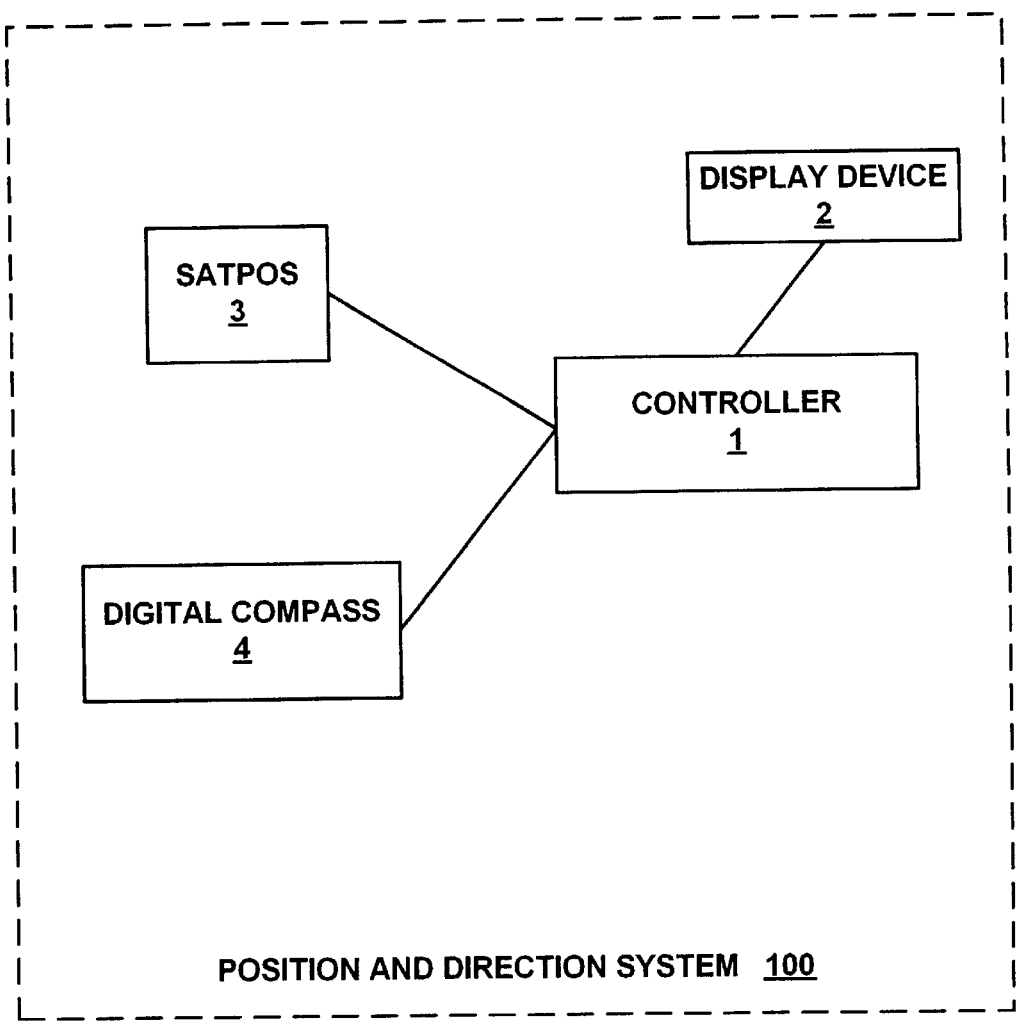
FIG. 1 is a diagram of a position and direction system in accordance with one embodiment of the present claimed invention.

FIG. 1 is a logical representation of components of integrated position and direction system 100 in accordance with one embodiment of the present invention. Integrated position and direction system 100 includes Satellite Positioning System (SATPOS) 3 that is operable for determining position. In one embodiment, SATPOS 3 is adapted to determine position using a Satellite Positioning System such as the US Global Positioning System (GPS).

In operation, SATPOS 3 determines its location by analysis of satellite position determining signals such as signals from satellites of the US GPS. Position signal processing circuitry in SATPOS 3 also determines the direction of movement of SATPOS 3, referred to hereinafter as "heading" and couples the determined heading to controller 1. In the present embodiment, heading is determined by comparing satellite position determining signals received as the integrated position and direction system 100 moves.

Integrated position and direction system 100 of FIG. 1 also includes digital compass 4. Digital compass 4 is operable to determine direction and couple direction to controller 1. More particularly, in the present embodiment, digital compass 4 determines the compass direction that corresponds to the orientation of the integrated position and direction system 100.

Continuing with FIG. 1, controller 1 controls the operation of integrated position and direction system 100. In one embodiment, controller 1 is a general-purpose computer. Alternatively, controller 1 is an integrated circuit device such as a microcontroller or an Application Specific Integrated Circuit (ASIC) device or a Field Programmable Gate Array (FPGA) device. In one embodiment, the functions of controller 1 are performed by a general purpose microprocessor that is operable to execute instructions contained in one or more software program(s).

In the present embodiment, controller 1 is operable to display the determined position and the determined direction and/or heading on display 2. Display device 2 may be a liquid crystal device, flat panel display, or other display device suitable for creating graphic images and alphanumeric characters recognizable to the user.

Figure 2:
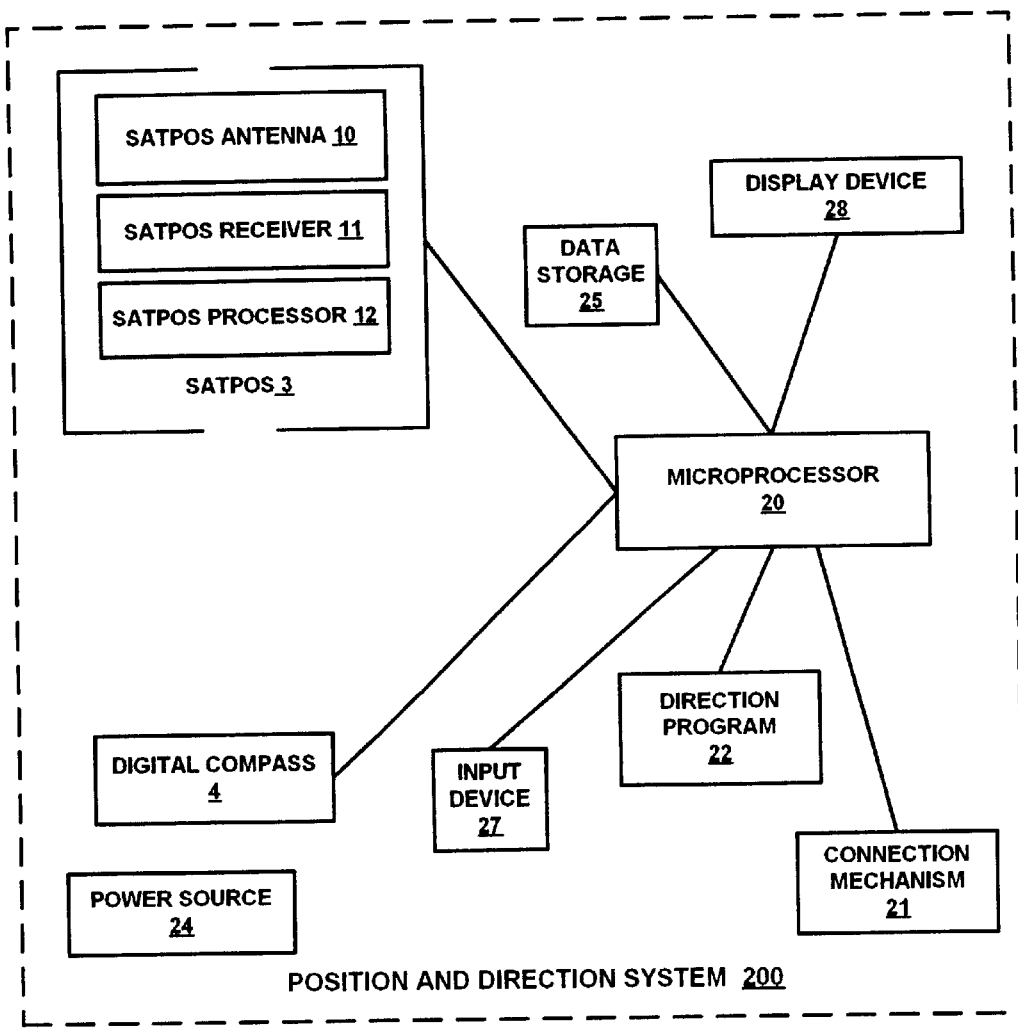
FIG. 2 is a diagram of an embodiment of the position and direction system of FIG. 1 in accordance with one embodiment of the present claimed invention.
Figure 3:
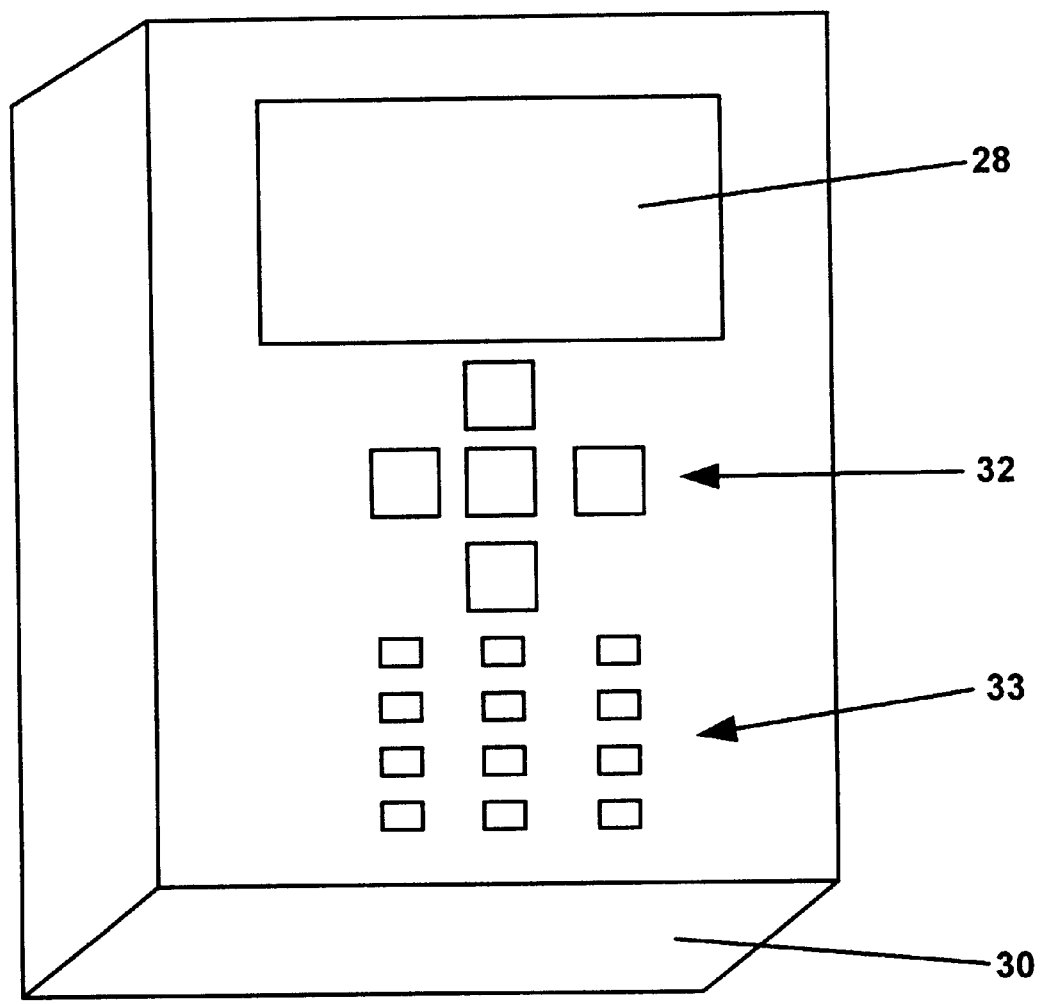
FIG. 3 is a perspective view of an embodiment of the position and direction system of FIG. 2 in accordance with one embodiment of the present claimed invention.

FIGS. 2–3 show an embodiment of the present invention that is incorporated into a handheld portable housing. That is, the housing is small enough to fit into a user's hand.

Referring now to FIG. 2, integrated position and direction system 200 is shown to include SATPOS 3 that is operable for determining position. In the present embodiment, SATPOS 3 includes SATPOS antenna 10, SATPOS receiver 11, and SATPOS processor 12. In one embodiment, SATPOS processor 12 is a GPS processor made by Trimble Navigation, Ltd. of Sunnyvale, Calif. In this embodiment, SATPOS antenna 10 is an ACE II GPS™ antenna, manufactured by Trimble Navigation, Ltd. and SATPOS receiver 11 includes a SIERRA GPS™ chipset, manufactured by Trimble Navigation, Ltd. Although such a specific implementation is described, the present invention is also well suited to an embodiment having various other components and features.

Referring still to FIG. 2, microprocessor 20, in conjunction with direction program 22 perform the functions of controller 1 of FIG. 1. That is, in the present embodiment, direction program 22, operable on microprocessor 20 controls the operations of integrated position and direction system 200. In the present embodiment, microprocessor 20 is a general-purpose microprocessor that has low power consumption such as, for example, a Motorola RISC microprocessor made by Motorola Inc., of Austin, Tex. Alternatively, other types of processors, an ASIC device or a FPGA device can be used.

Continuing with FIG. 2, power source 24 provides power to the various components of integrated position and direction system 200. Power source 24 may be any suitable power source that is light-weight and compact such as, for example, built-in rechargeable batteries, M batteries or AAA batteries.

Data storage device 25 is coupled to controller 20 and is adapted to store data. Data that can be stored in data storage device 25 includes, for example, an operating software program such as direction program 22. Data storage device 25 may be any type of digital data storage medium. In one embodiment, data storage device 25 is a Random Access Memory (RAM) device such as, for example, a Static Random Access Memory (SRAM) device, a Dynamic Random Access Memory (DRAM) device. Alternatively, other types of memory storage devices such as flash memory, tape, CD ROM, or DVD may be used.

Referring still to FIG. 2, connection mechanism 21 is coupled to microprocessor 20 and is adapted to connect to external devices such as, for example external computers. This allows for easily and quickly downloading new programs for operation on microprocessor 20 and allows for updating direction program 22. In one embodiment, connection mechanism 21 is a connector that complies with the RS-232 standard.

With reference again to FIG. 2, display device 28 is also electrically coupled to microprocessor 20. In one embodiment, display device 20 is an active matrix liquid crystal display. Alternatively a cathode ray tube, or other display device suitable for creating graphic images and alphanumeric characters recognizable to the user can be used.

Input device 27 is coupled to microprocessor 20 and allows for coupling user input to microprocessor 20. In the present embodiment, input device 27 includes function keys and an alphanumeric keypad. Alternatively, input device 27 includes a trackball, mouse, touch pad, joystick. The present invention is also well suited to receiving user input by other means such as, for example, voice commands.

Referring now to FIG. 3, an embodiment of position and direction system 200 is shown that is incorporated into housing 30 that is small enough to hold in a user's hand. In the present embodiment, function keys 32 and alphanumeric keypad 33 allow for coupling user input to position and direction system 200. In one embodiment, one or more of function keys 32 operates as a cursor control device. That is, one or more of function keys 32 allows the computer user to dynamically signal the two-dimensional movement of a visible symbol (cursor) on the display screen of display device 28.

Figure 4:
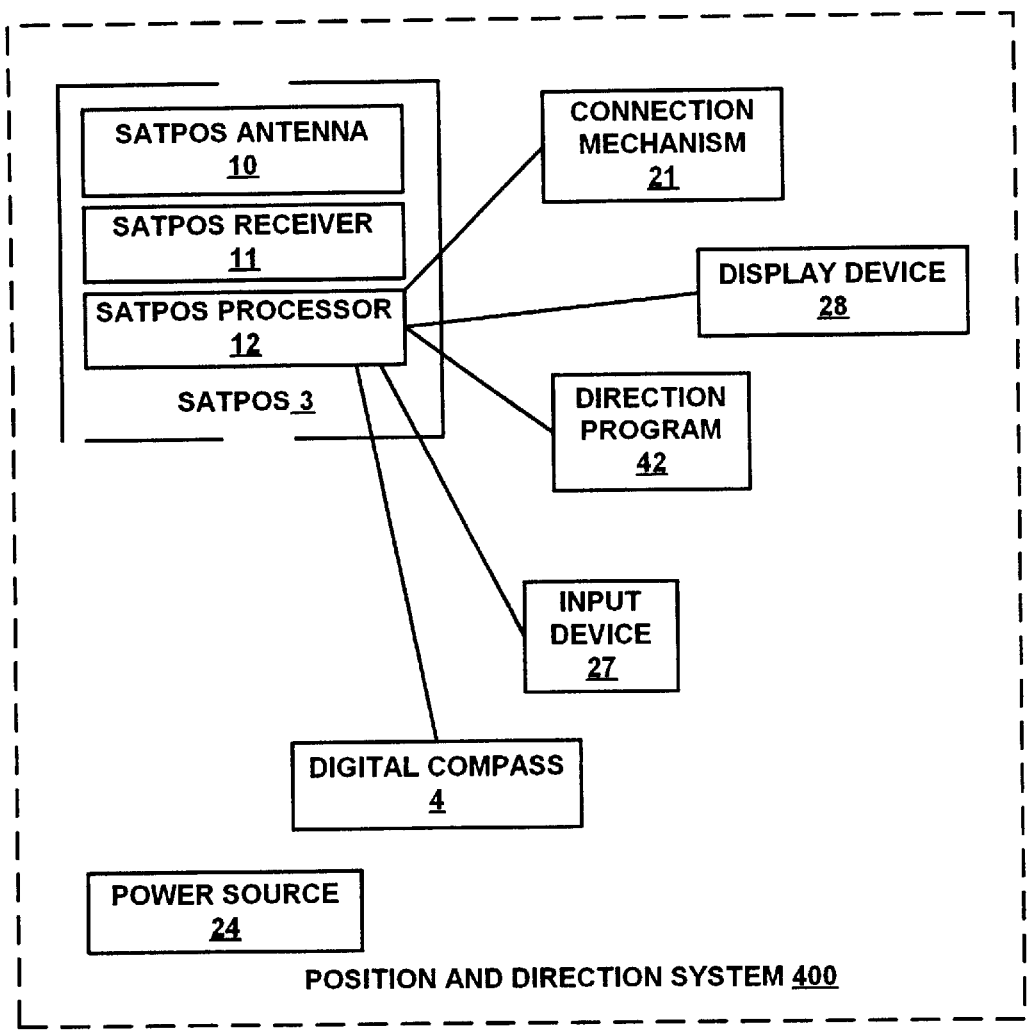
FIG. 4 is a diagram of a position and direction system in accordance with one embodiment of the present claimed invention.

FIG. 4 shows an embodiment of the present invention in which SATPOS processor 12 is used for controlling the operations of the integrated position and direction system 400. Because SATPOS processor 12 is used for controlling the operations of integrated position and direction system 400, there is no need for a second microprocessor such as microprocessor 20 of FIG. 2.

In the embodiment shown in FIG. 4, SATPOS processor 12 is operable to determine position and heading using SATPOS signals and is also operable to receive direction determined by digital compass 4. In this embodiment, SATPOS processor 12 includes instructions for determining which source of direction signals (heading from SATPOS signals or direction determined by digital compass 4) is to be indicated (e.g., displayed) on display device 28. In the present embodiment, these instructions are contained in direction program 42 that controls the operations of integrated position and direction system 400. Direction program 42 is a computer program that is operable on SATPOS processor 12. However, alternatively, instructions necessary for the operation of integrated position and direction system 400 can be implemented on an ASIC, a FPGA, or similar device.

In the present embodiment, position is indicated on display device 28. In one embodiment, position is indicated alphanumerically using latitude and longitude. Alternatively, position is indicated by an icon displayed on a moving map display.

In the present embodiment, reference to a satellite position determination system, or "SATPOS" herein refers to a Global Positioning System (GPS), to a Global Orbiting Satellite System (GLONASS), and to any other positioning system, including pseudolites, that provide signals that can be used to determine position. The term "satellite position determination system" and "SATPOS" as used herein, is intended to include position determination using pseudolites or equivalents of pseudolites, and the term "satellite position determination system signals" and "SATPOS signals," as used herein, is intended to include position determination system-like signals and data from pseudolites or equivalents of pseudolites. Also, signals from other sources such as LORAN, Wide Area Augmentation System (WMS) satellites, etc. may be used to determine position.

In the embodiments shown in FIGS. 1–4, digital compass 4 is used to determine direction. In the present embodiment, digital compass 4 is a compass that determines direction by detection of electromagnetic flux. In the present embodiment, digital compass 4 is a magnetic field sensor made by Honeywell, Inc. Any of a number of different types of commercially available digital compasses can be used.

Figure 11:
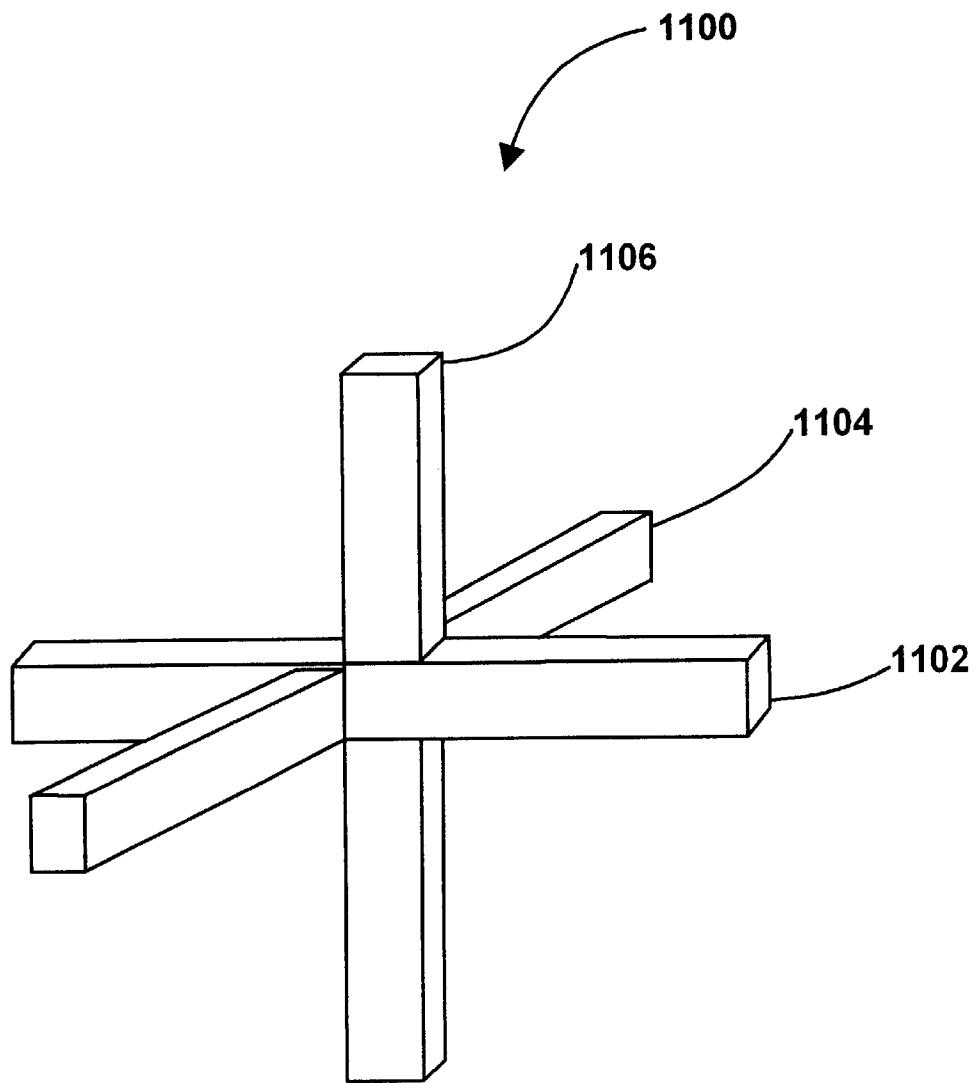
FIG. 11 is a schematic representation of an exemplary configuration for a 3-Sensor magnetic sensor in accordance with one embodiment of the present claimed invention.

Referring now to FIG. 11, a schematic representation of a magnetic field sensor 1100 in accordance with one embodiment of the present invention is shown. In this embodiment, magnetic field sensor 1100 is comprised, in part, of three sensors 1102, 1104, and 1106. By having three sensors, magnetic field sensor 1100 is able to determine the elevation angle of integrated position and direction system 100 of FIG. 1. More specifically, in one embodiment, sensors 1102 (x-direction sensor) and 1104 (y-direction sensor) determine the azimuthal orientation of integrated position and direction system 100. However, the determination of azimuthal orientation will determined with the assumption that integrated position and direction system 100 is held level. Thus, if, for example, a user of integrated position and direction system 100 is walking up a steep hill; walking down a steep hill; holding the integrated position and direction system 100 in a vertically oriented manner; and the like, the accuracy of the determined azimuthal orientation may be severely compromised. By using magnetic field sensor 1100 which includes sensor 1106 (z-direction sensor), the present embodiment is able to correctly determine the azimuthal orientation of integrated position and direction system 100 by correcting for any variation from horizontal in the position of integrated position and direction system 100. That is, sensor 1106 of the present embodiment determines the variance in integrated position and direction system 100 from a truly horizontal position. It will be understood that in the representation of FIG. 11, when integrated position and direction system 100 is at a truly horizontal position, sensor 1106 will be vertically oriented. Although a specific schematic implementation is shown in FIG. 11, the present invention is well suited to use with any of a number of different types of commercially available digital compasses which compensate for variations from a horizontal orientation.

Referring still to FIG. 11, in one embodiment, in addition to correcting the determined azimuthal orientation of integrated position and direction system 100 for variance from a truly horizontal orientation, the present invention also determines (and optionally displays) the elevation angle of integrated position and direction system 100. In such an embodiment, the user is made aware not only of the accurate azimuthal orientation (i.e. the direction in which integrated position and direction system 100 is pointed), but the user is also informed of the elevation angle at which integrated position and direction system 100 is oriented. Hence, the user can determine, for example, the slope of a hill by holding integrated position and direction system 100 parallel to the surface of the hill and reading the determined elevation angle. Additionally, although magnetic field sensor 1100 is comprised, in part, of three orthogonally oriented sensors 1102, 1104, and 1106 in the present embodiment, the present invention is also well suited to an embodiment in which more than three sensors are used and to an embodiment in which the plurality of sensors are arranged other than orthogonally.

Figure 5:
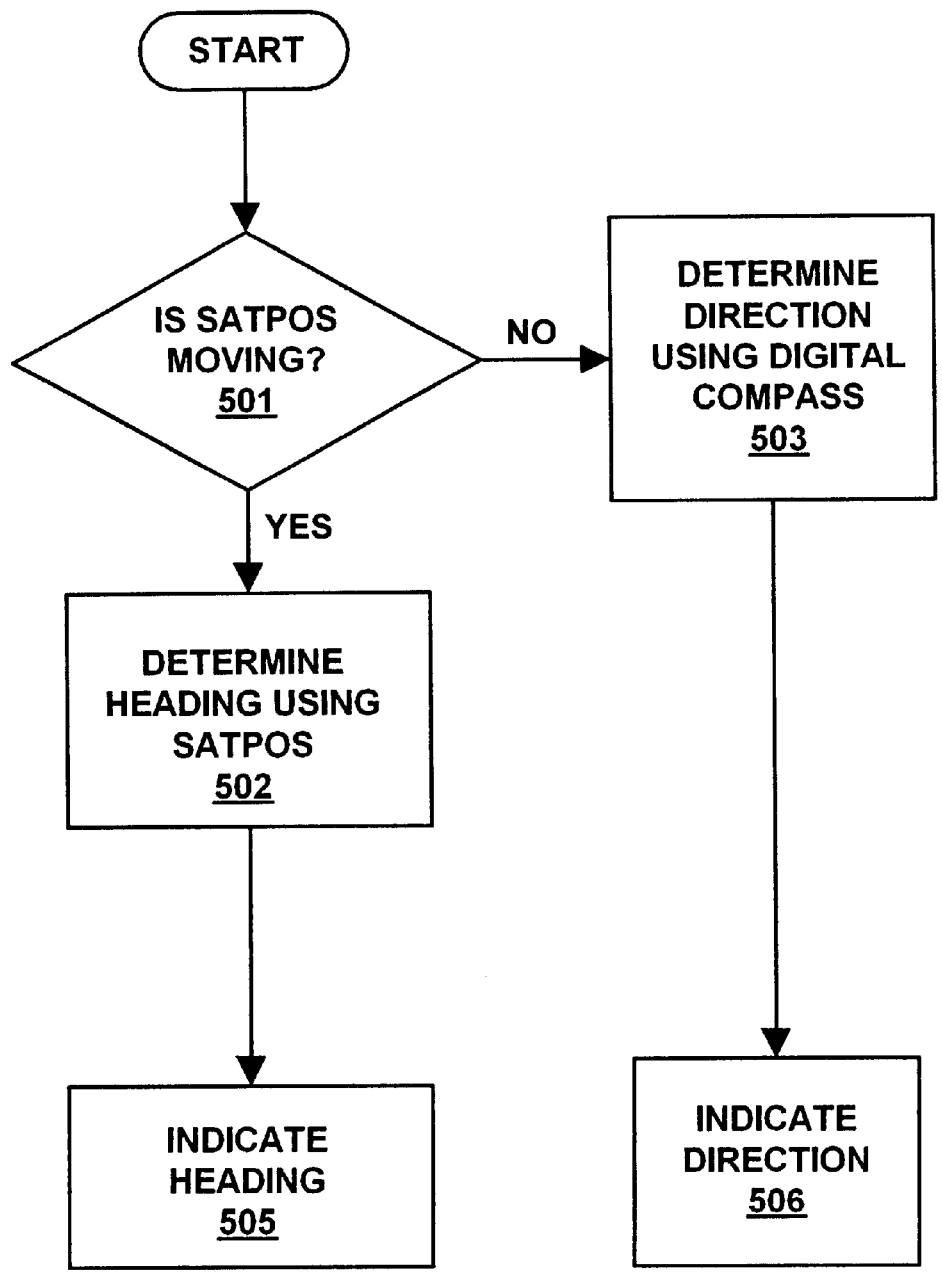
FIG. 5 is a flow chart illustrating a method for indicating direction and heading in accordance with one embodiment of the present claimed invention.

FIG. 5 shows a method for indicating direction and heading according to one embodiment of the present invention. As shown by steps 501–502, when the SATPOS is moving, heading is determined using the SATPOS. In the present embodiment, a satellite positioning system including a receiver adapted to receive satellite position determining signals such as, for example, SATPOS 3 of FIGS. 1–4 is used to both determine whether the SATPOS is moving and to determine heading.

In one embodiment of the present invention, the determination of whether the SATPOS is moving (step 501) is made by comparing the velocity of movement to a threshold velocity. In the present embodiment, prior determinations of position are compared to the most recent determination of position, along with the time of each determination of position to determine the velocity of movement of the SATPOS. When the velocity is determined to be greater than the threshold velocity, the SATPOS is considered to be moving.

As shown by step 505 of FIG. 5, when the SATPOS is moving, heading is indicated using the heading determined in step 502. In the embodiment shown in FIG. 1, display device 2 is used to indicate heading; and in the embodiment shown in FIGS. 2–3, display device 28 is used to indicate heading.

Still referring to FIG. 5, when the SATPOS is not moving, as shown by steps 501 and 503, direction is determined using the digital compass. In the present embodiment digital compass 4 of FIGS. 1–4 is used for determining direction.

As shown by step 506 of FIG. 5, when the SATPOS is not moving, direction is indicated using the direction determined by the digital compass in step 503. In the embodiment shown in FIG. 1, display device 2 is used to indicate direction; and in the embodiment shown in FIGS. 2–3, display device 28 is used to indicate direction.

The indications of direction and heading steps 505–506 can take any of a number of different forms. In one embodiment, heading and direction are indicated using a displayed compass rose. That is, icons representing a compass rose are displayed on, for example, display device 2 of FIG. 1 or display device 28 of FIGS. 2–3.

Figure 6A:
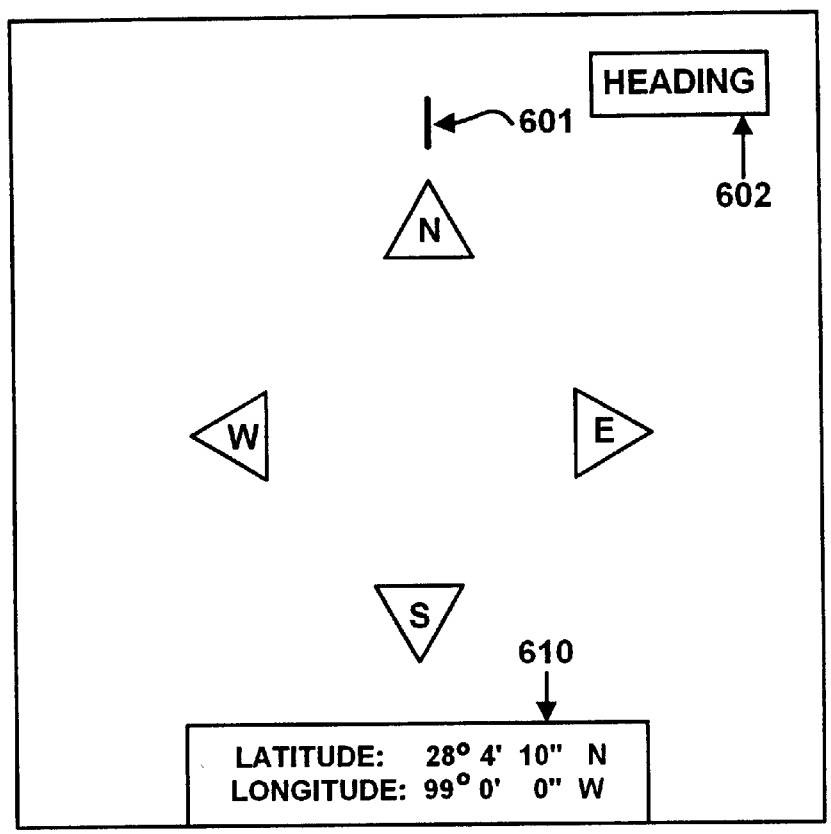
FIG. 6A is a diagram showing an exemplary display that indicates position and heading in accordance with one embodiment of the present claimed invention.
Figure 6B:
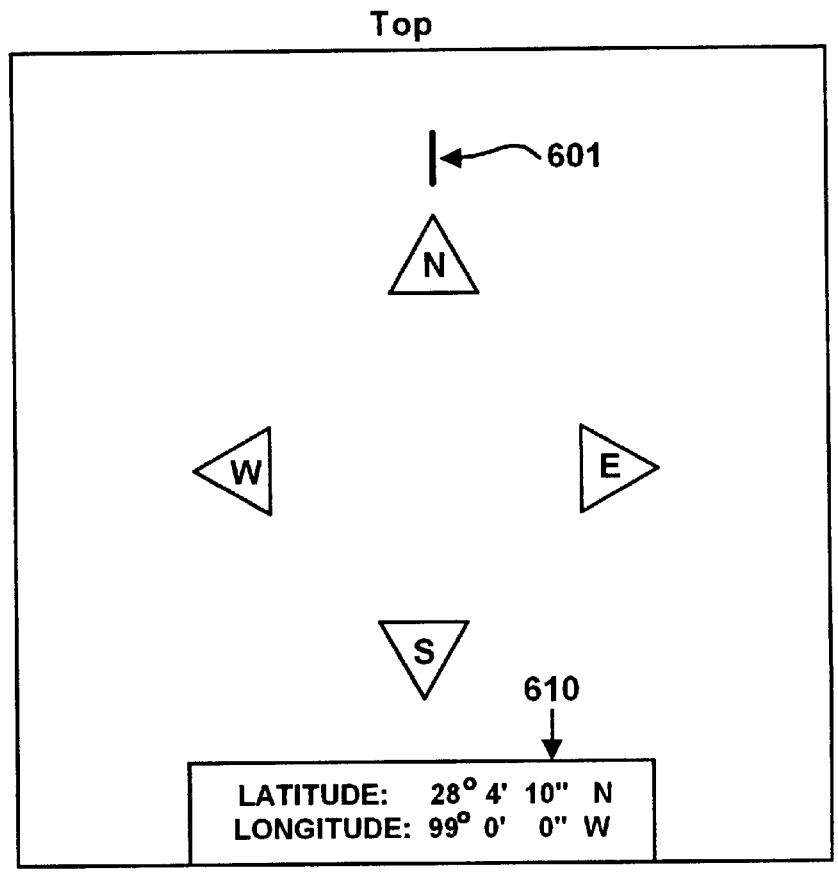
FIG. 6B is a diagram showing an exemplary display that indicates position and direction in accordance with one embodiment of the present claimed invention.

In one embodiment of the present invention the direction and heading indicated in steps 505–506 are indicated using a four-point compass rose. That is, direction is indicated relative to the compass points of North(N), South(S), East (E), and West(W). FIGS. 6a–6b show exemplary displays 600a–600b that include a four-point compass rose that can be used to indicate either heading (step 505 of FIG. 5) or direction (step 506 of FIG. 5).

Referring now to FIGS. 6a–6b, in the present embodiment, an icon is used to indicate whether heading is being displayed or whether direction is being displayed. More particularly, in display 600a of FIG. 6a, icon 602 is displayed to indicate to the user that heading is being displayed. Referring now to FIG. 6B, display 600b indicates that direction is being displayed. That is, the absence of icon 602 of FIG. 6A indicates that the digital compass is being used and that direction is being displayed.

In the embodiments shown in FIGS. 6A–6B, the compass rose is displayed such that direction and heading are indicated relative to alignment mark 601. That is, the compass rose is rotated such that the proper direction or heading is always indicated by reference to alignment mark 601. Thus, in the embodiment shown in FIG. 6A, because the compass point of N is aligned with alignment mark 601, display 600a indicates that the SATPOS has a heading directly to the North. Similarly, in the embodiment shown in FIG. 6B, because the compass point of N is aligned with alignment mark 601, display 600b indicates a North direction. That is, the SATPOS is oriented such that alignment mark 601 is pointing directly to the North.

Figure 7A:
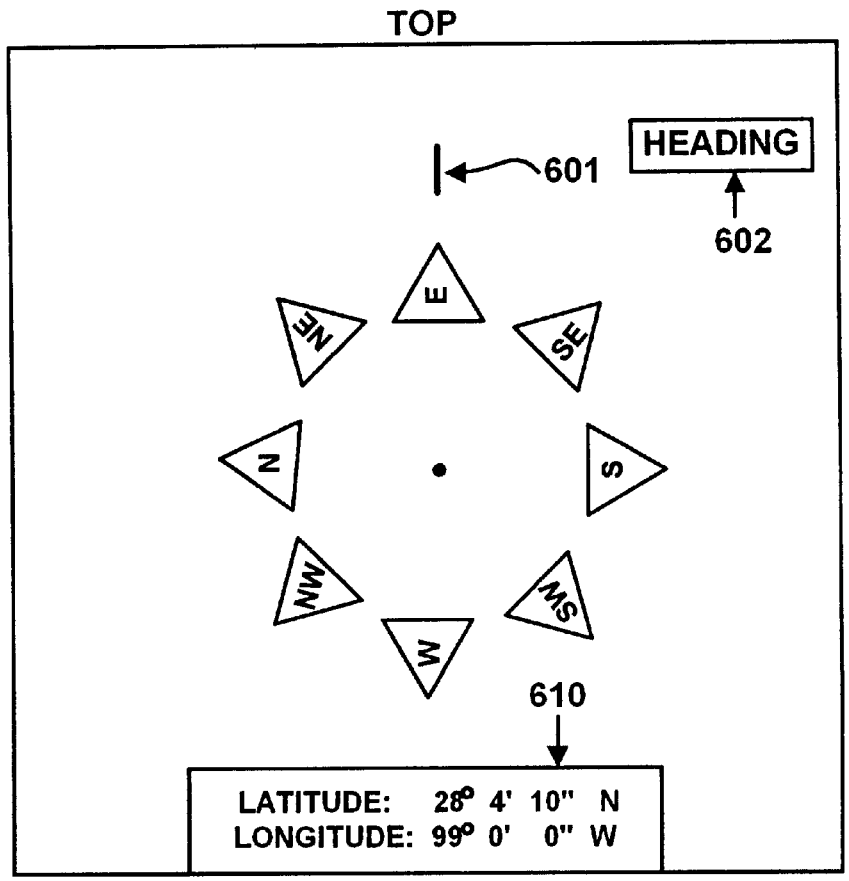
FIG. 7A is a diagram showing an exemplary display that indicates position and heading in accordance with one embodiment of the present claimed invention.
Figure 7B:
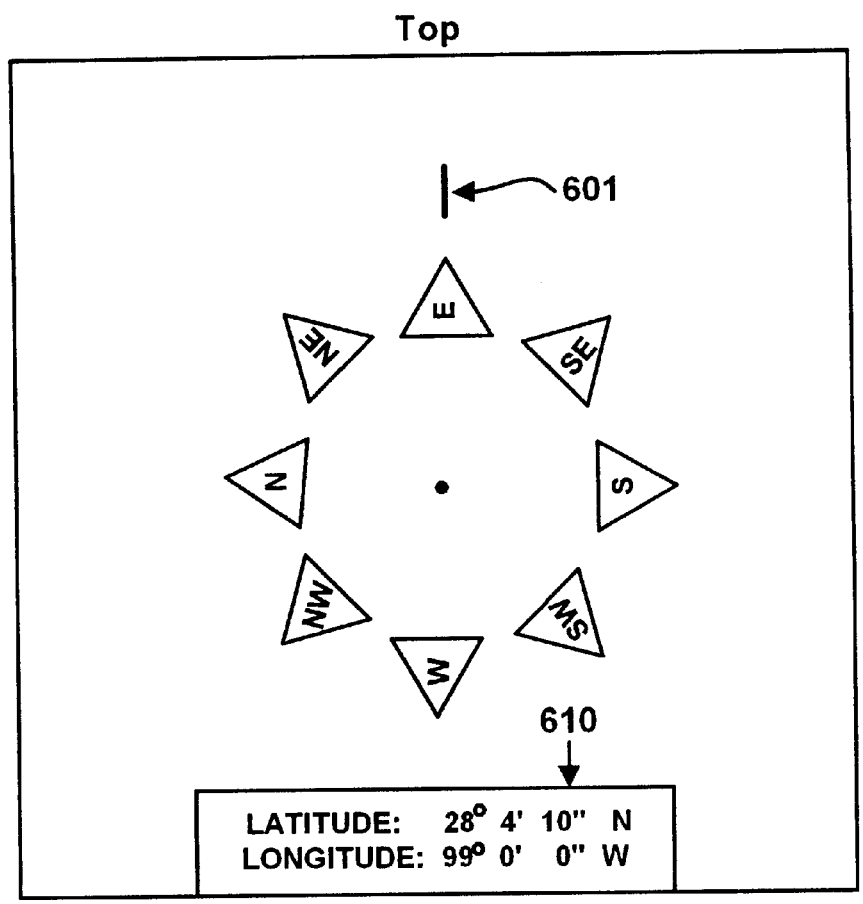
FIG. 7B is a diagram showing an exemplary display that indicates position and direction in accordance with one embodiment of the present claimed invention.

FIGS. 7A–7B shown an embodiment in which direction and heading are indicated using an eight-point compass rose. That is, direction and heading are indicated relative to the compass points of North(N), South(S), East(E), West(W), North East(NE), South East(SE), South West(SW), and North West(NW).

Referring now to FIGS. 7A–7B, exemplary displays 700a and 700b are shown to include an eight-point compass rose that can be used to indicate either heading (step 505 of FIG. 5) or direction (step 506 of FIG. 5). As in the embodiment shown in FIGS. 6A–6B, direction and heading are indicated relative to alignment mark 601 and icon 602 indicates whether direction or heading is being displayed.

In the embodiment shown in FIG. 7A, because the compass point of E is aligned with alignment mark 601, and because icon 602 is displayed, display 700a indicates that the SATPOS has a heading directly to the East. Similarly, in the embodiment shown in FIG. 7B, because the compass point of E is aligned with alignment mark 601, and because icon 602 is not displayed, display 700b indicates a East direction. That is, the SATPOS is oriented such that the top of the display, as indicated by alignment mark 601, is pointing directly to the East.

Figure 8A:
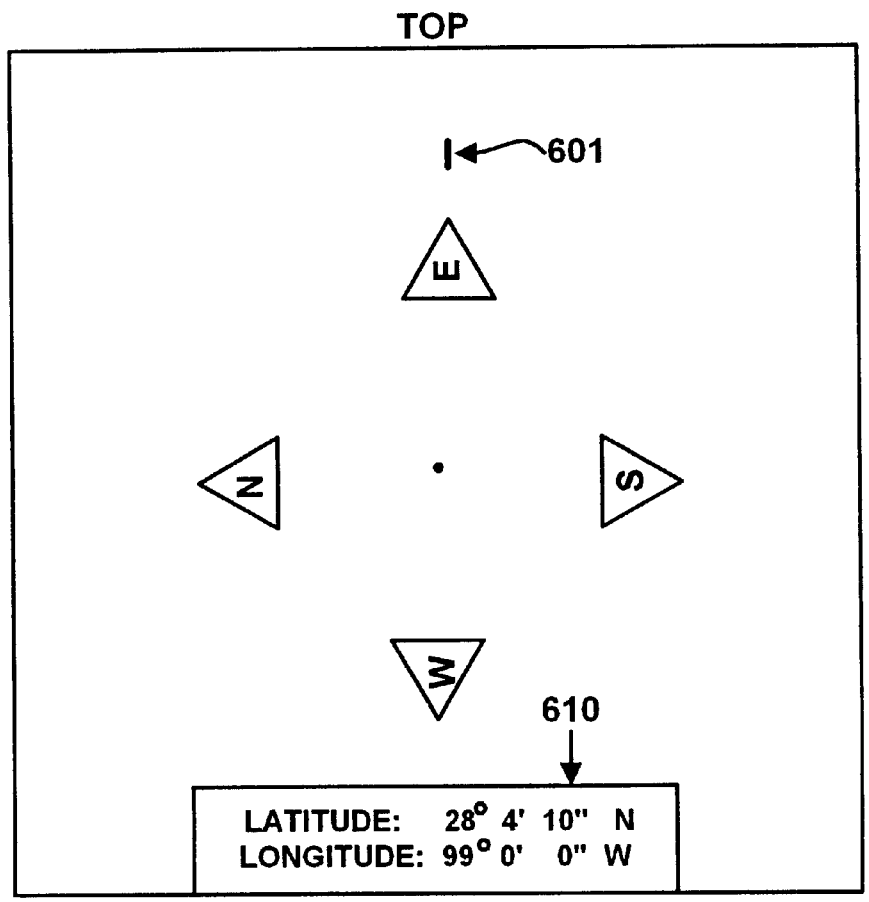
FIG. 8A is a diagram showing an exemplary display that indicates position and heading in accordance with one embodiment of the present claimed invention.
Figure 8B:
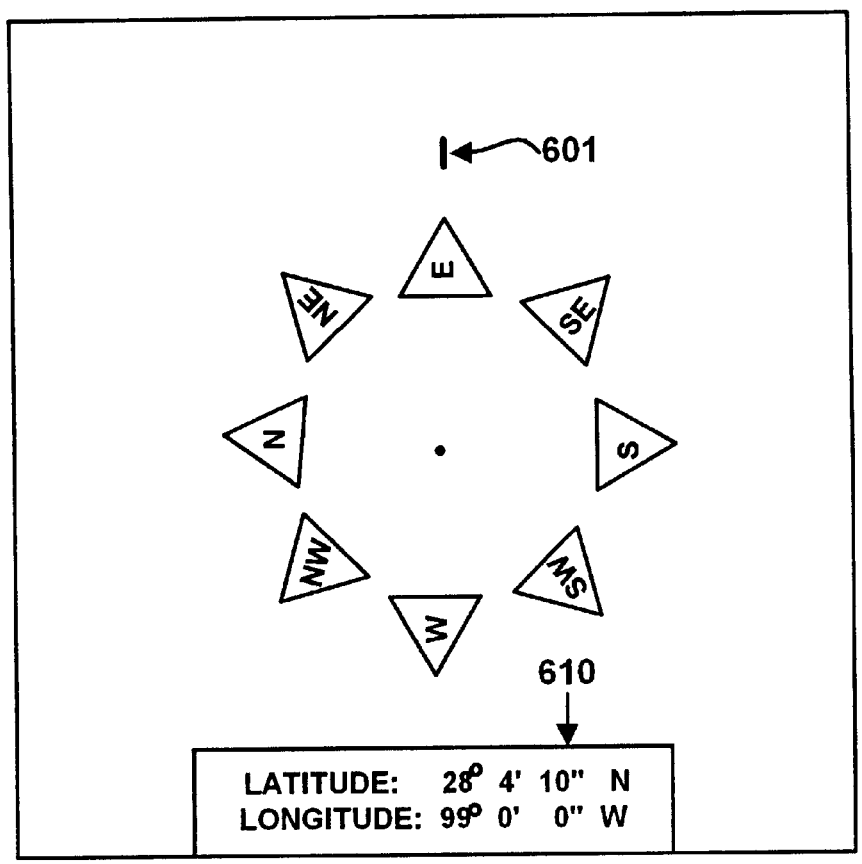
FIG. 8B is a diagram showing an exemplary display that indicates position and direction in accordance with one embodiment of the present claimed invention.

FIGS. 8A–8B show an embodiment in which both a four point compass rose and an eight-point compass rose are used. In the present embodiment, the display of a four-point compass rose indicates that heading (step 505 of FIG. 5) is being displayed while the display of an eight-point compass rose indicates that direction (step 506 of FIG. 5) is being displayed. In the embodiment shown in FIGS. 8A–8B, direction and heading are indicated relative to the top of the display, as indicated by alignment mark 601.

Now referring to display 800a of FIG. 8A, because the compass point of E is aligned with alignment mark 601, and because a four-point compass rose is displayed, display 800a indicates that the SATPOS has a heading directly to the East. Similarly, in the embodiment shown in FIG. 8B, because the compass point of E is aligned with alignment mark 601, and because an eight-point compass rose is displayed, display 800b indicates a East direction. That is, the SATPOS is oriented such that the top of the display, as indicated by alignment mark 601 is pointing in the cardinal direction of East.

The apparatus and method of the present invention automatically switches between displays of heading and direction as the SATPOS moves and stops moving. Thus, the method and apparatus of the present invention provide an uninterrupted display that can be used to find features, waypoints, etc. In the present embodiment, either heading or direction is continually displayed.

In the present embodiment, the determined position is also indicated. In the embodiment shown in FIGS. 6A–8B, position is indicated alphanumerically using latitude and longitude as shown by icon 610. Alternatively, position is indicated by an icon displayed on a moving map display.

Figure 9A:
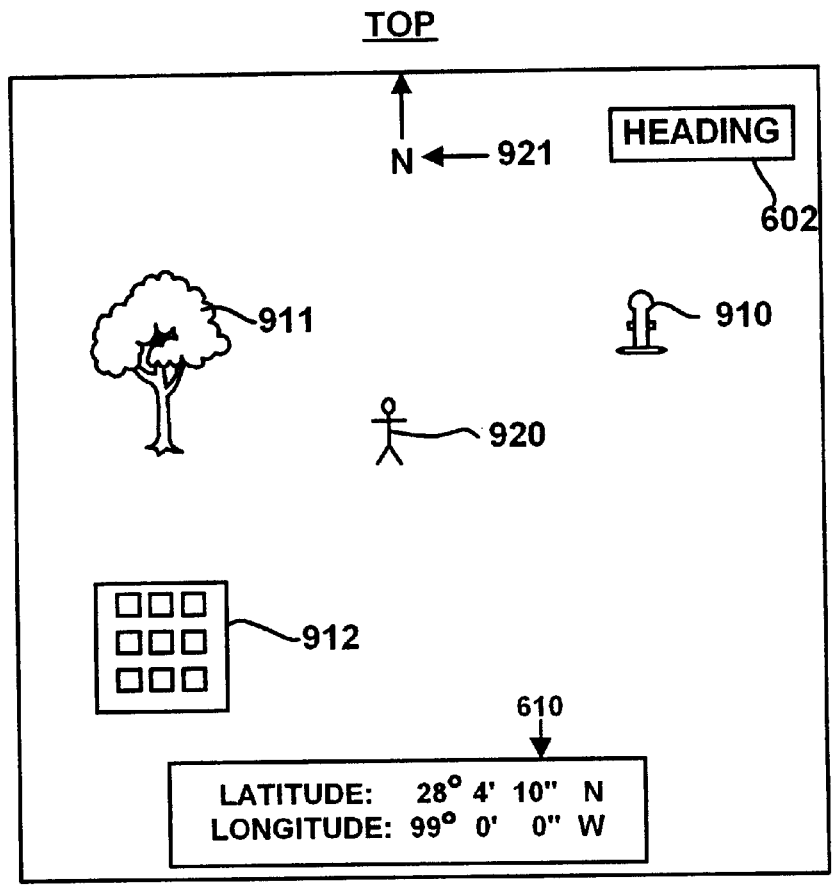
FIG. 9A is a diagram showing an exemplary display that indicates position and heading in accordance with one embodiment of the present claimed invention.
Figure 9B:
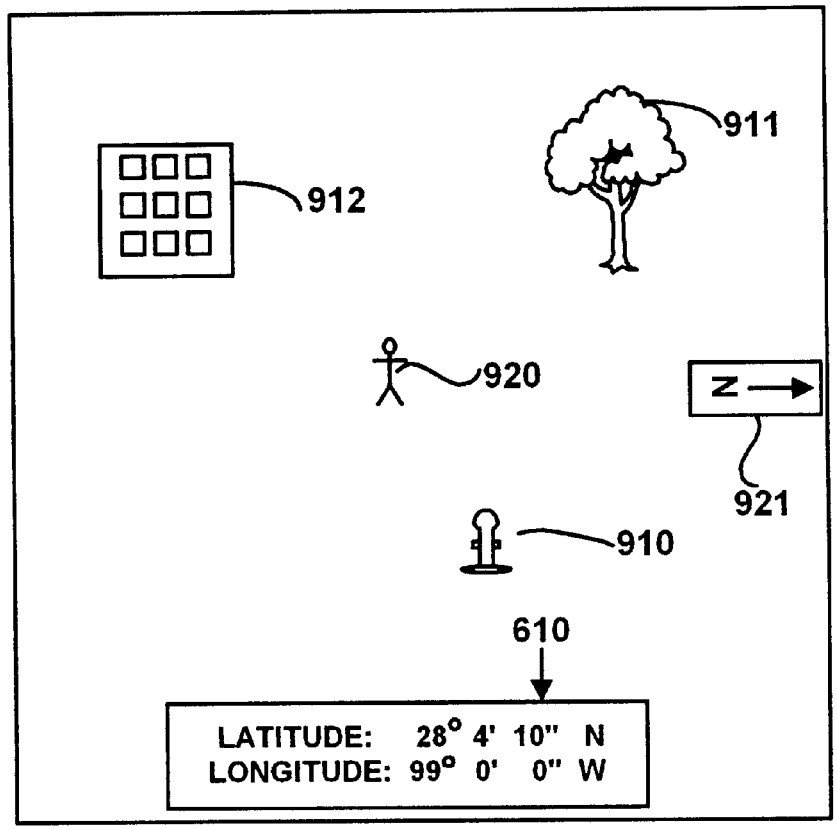
FIG. 9B is a diagram showing an exemplary display that indicates position and direction in accordance with one embodiment of the present claimed invention.

In one embodiment of the present invention, position, direction and heading are indicated using a moving map display. FIGS. 9A–9B shows an exemplary display 900 that includes position icon 901 that indicates the position of the SATPOS relative to icons 910–912 that represent features. In the present embodiment, icon 910 indicates the position of a feature that is a fire hydrant, icon 911 indicates the position of a feature that is a tree, and icon 912 indicates the position of a feature that is a building.

Referring now to FIGS. 9A–9B, exemplary displays 900a and 900b are shown to include position icon 920 that indicates the position of the SATPOS relative to features 910–912. As in the embodiment shown in FIGS. 6A–7B, an icon 602 is displayed to indicate whether direction or heading is being displayed. In the present embodiment, an icon 921 that indicates the direction of North is also displayed so that the user can determine the orientation of the moving map display.

Referring now to FIG. 9A, an exemplary display 900a is shown that indicates a heading of North. That is, because heading icon 602 is displayed, a display of heading is indicated (step 505 of FIG. 5). Because the map is oriented such that the North icon is pointed to the top of the display, the heading is indicated as being directly to the North.

Referring now to FIG. 9B, an exemplary display 900b is shown that indicates a direction of West. That is, because heading icon 602 is not displayed, a display of direction is indicated (step 506 of FIG. 5). Because the map is oriented such that the North icon is pointed to the right side of the display, the direction is indicated as being directly to the West. That is, the display is oriented such that the top of the display points in the cardinal direction of West.

The apparatus and method of the present invention automatically switches between displays of heading and direction as the SATPOS moves and stops moving. Thus, the method and apparatus of the present invention provide an uninterrupted display that can be used to find features such as, for example, features 910–912 of displays 900a–900b.

The present invention is well adapted for other indications of heading and direction other than those shown in FIGS. 6A–9B. In one embodiment, heading and/or direction are indicated using an indication of degrees from 0 to 360 degrees. That is, a number is displayed on the display device that indicates cardinal direction with 0 and 360 being North. That is, in the embodiment shown in FIG. 1, display device 2 displays a number from 0 to 360; and in the embodiment shown in FIGS. 2–3, display device 28 displays a number from 0 to 360.

The embodiments shown in FIGS. 1–9B of the present invention provide a method and apparatus for providing an accurate indication of direction and heading to a user of a SATPOS device. When the user is stationary, position is accurately indicated using a digital compass. When the user is moving, the direction of movement(heading) is accurately indicated. Because the integrated position and direction system of the present invention always indicates either heading or direction, the user is always able to locate features, waypoints, etc.

Prior art digital compasses are typically calibrated manually by rotating the digital compass in a circular arc. The digital compass of the present invention can be manually calibrated using this technique.

In one embodiment of the present invention the digital compass is automatically calibrated using the SATPOS determination of heading. In one embodiment of the present invention, the digital compass is automatically calibrated upon selection of an icon or button that indicates "Automatic Compass Calibration" when the position and direction system of the present invention is moving (e.g. when step 501 of FIG. 5 indicates that the SATPOS is moving).

In one embodiment of the present invention, the digital compass is automatically calibrated on a periodic basis, without any required input from the operator, when the SATPOS is moving. In one embodiment, the digital compass is automatically calibrated according to user selectable time periods. In the present embodiment, the user can select time periods of ten minutes, 30 minutes, one hour, four hours, or 12 hours. Thus, for example, when a user selects a time period of ten minutes, the digital compass is calibrated when the digital compass begins to move and every ten minutes thereafter until the digital compass stops moving. This provides for easily maintaining the accuracy of the digital compass.

In the present embodiment, the digital compass is calibrated by determining heading using the SATPOS, and adjusting the direction indicated by the digital compass according to the heading determined by the satellite positioning system. In the embodiment shown in FIG. 1, controller 1 is operable to automatically calibrate the digital compass; in the embodiment shown in FIGS. 2–3, direction program 22 is operable to automatically calibrate the digital compass; and in the embodiment shown in FIG. 4, direction program 42 is operable to automatically calibrate the digital compass.

Figure 10:
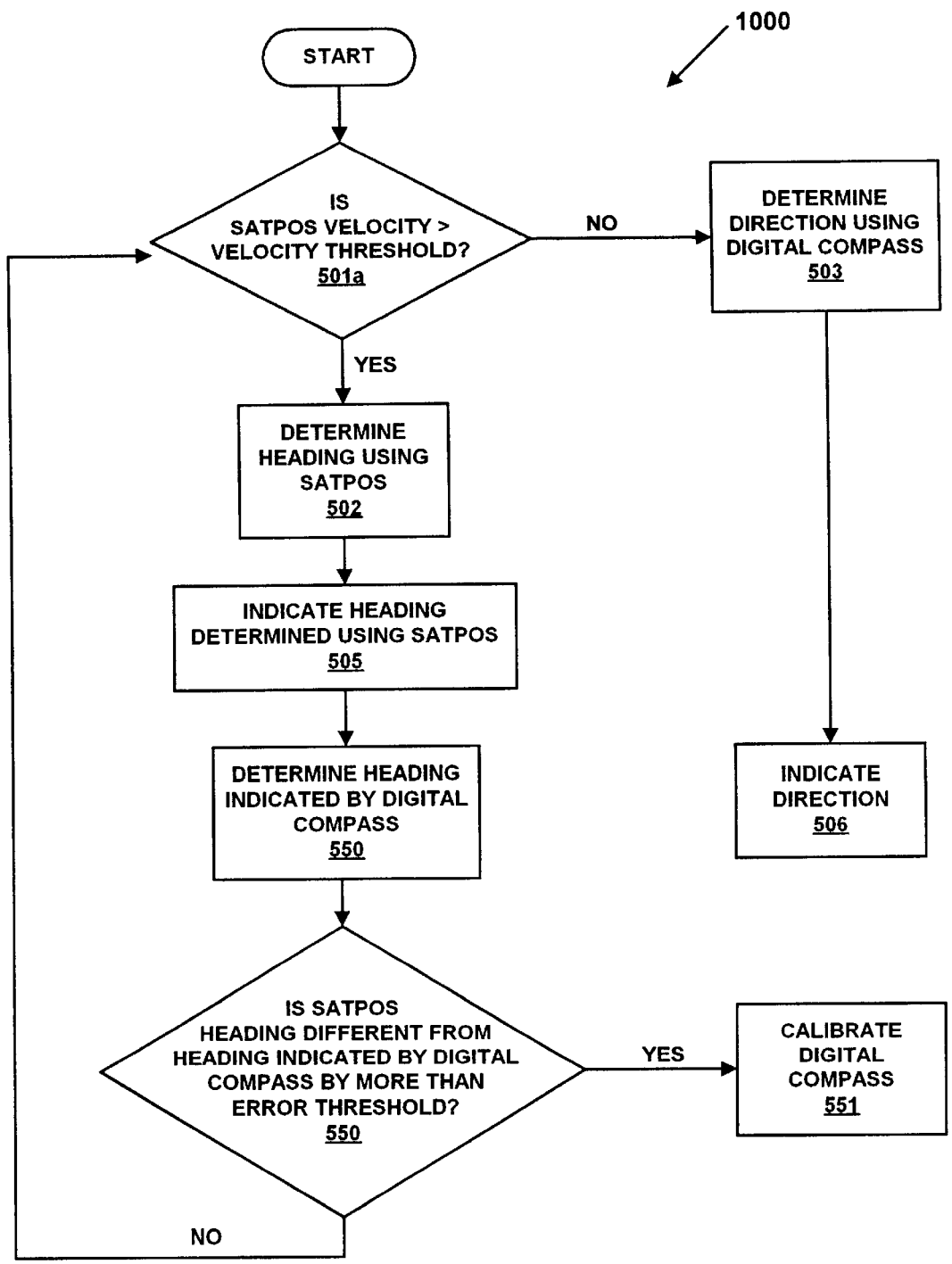
FIG. 10 is a flow chart illustrating a method for calibrating a digital compass in accordance with one embodiment of the present claimed invention.

FIG. 10 shows a method for calibrating a digital compass 1000 in which a digital compass (e.g. digital compass 4 of FIGS. 1–4)is calibrated using a heading determined using a SATPOS (e.g., SATPOS 3 of FIGS. 1–4). Referring now to step 501a the velocity determined by the SATPOS is compared to a threshold velocity. If the velocity is not greater than the threshold velocity (steps 501a and 503), direction is determined using the digital compass(step 503), and direction is indicated as shown by step 506.

Continuing with FIG. 10, if the velocity is not greater than the threshold velocity, heading is determined using the SATPOS as shown by steps 501a and 502. The heading determined using the SATPOS is then indicated as shown by step 505.

Still referring to FIG. 10, as shown by step 550, the heading indicated by the digital compass is determined. In the embodiment shown in FIG. 1, controller 1 is operable to determine the heading indicated by the digital compass using input from digital compass 4; in the embodiment shown in FIGS. 2–3, direction program 22 is operable to determine the heading indicated by the digital compass; and in the embodiment shown in FIG. 4, direction program 42 is operable to determine the heading indicated by the digital compass.

The heading indicated by the digital compass is then compared to the heading determined using the SATPOS as shown by step 550. If the difference between the heading determined using the SATPOS and the heading indicated by the digital compass by more than a predetermined error threshold, the digital compass is calibrated as shown by steps 550–551. In one embodiment, a default error threshold of between one to two percent is initially used, which can be altered by the user at any time to accommodate the needs of that particular user. The present embodiment allows for the automatic calibration of the digital compass whenever the heading indicated by the digital compass significantly varies from the heading determined using the SATPOS.

As discussed above, the present invention provides for automatically calibrating a digital compass, either as a result of user input (e.g., selection of an icon, pressing of a button, etc.), or as a result of user-defined criteria for automatic calibration. That is, the user can program the present invention to automatically calibrate the digital compass (e.g. when velocity exceeds a given threshold, whenever the SATPOS begins moving, periodically while the SATPOS is moving, when the difference between the SATPOS determined heading differs from the heading indicated by the digital compass by more than a predetermined threshold, etc. The integrated position and direction system of the present invention is easy to use since there in no need for a user to manually calibrate the digital compass.

Though the embodiments shown in FIGS. 1–9B describe the indication of either direction or heading, the present invention is well adapted for display of both direction and heading when the SATPOS is moving.

Figure 12:
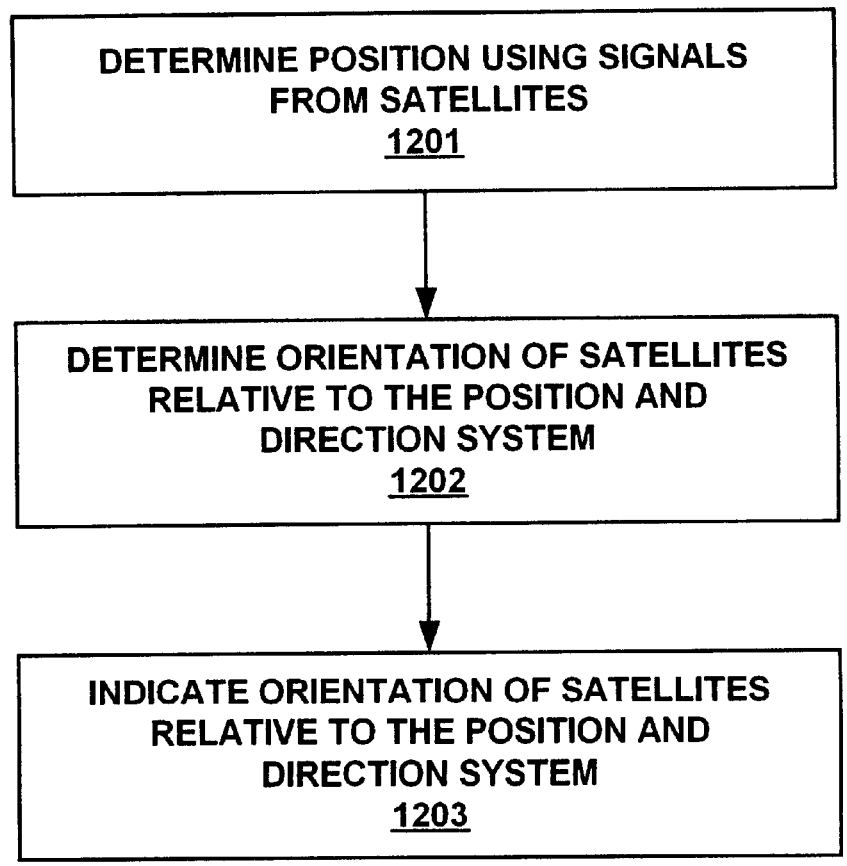
FIG. 12 is a flow chart illustrating a method for generating a skyplot in accordance with one embodiment of the present claimed invention.

Referring now to FIG. 12, a method 1200 for generating a skyplot is shown. Referring now to step 1201, position is determined using signals from satellites. In the present embodiment, SATPOS 3 of FIGS. 1–2 is used to determine position.

Referring now to step 1202, the orientation of satellites is determined relative to the position and direction system. In the present embodiment, SATPOS 3 of FIGS. 1–2 determines the location of the satellites that are transmitting signals that are received by the SATPOS 3 and then determines the orientation of the satellites relative to the position and direction system. In one embodiment, the position determined in step 1201 is used in conjunction with the positions of the satellites of the skyplot to make an initial determination of relative orientation (e.g., orientation relative to North). The orientation of the position and direction system is then determined and is used to orient the skyplot. Thus, for example, when the position and direction system is oriented in a direction of due West, the skyplot is oriented such that due West is at the top of the skyplot display. In one embodiment of the present invention, the determination of orientation of the position and direction system is made using digital compass 4. Alternatively, heading as indicated by SATPOS 3 can be used as the orientation of the position and direction system.

Next, as shown by step 1203, the orientation of the satellites relative to the position and direction system is indicated. In the present embodiment, this indication is in the form of a display that indicates the orientation of the satellites relative to the position determined in step 1201 and relative to the orientation of the position and direction system. In one embodiment of the present invention, the orientation of the satellites and the relative position of the satellites is shown using a moving map display that also displays the position determined in step 1201. In the present embodiment, display 28 of FIGS. 2–3 is used to indicate a skyplot that includes icons that are oriented relative to the position determined in step 1201 and relative to the orientation of the position and direction system.

Figure 13:
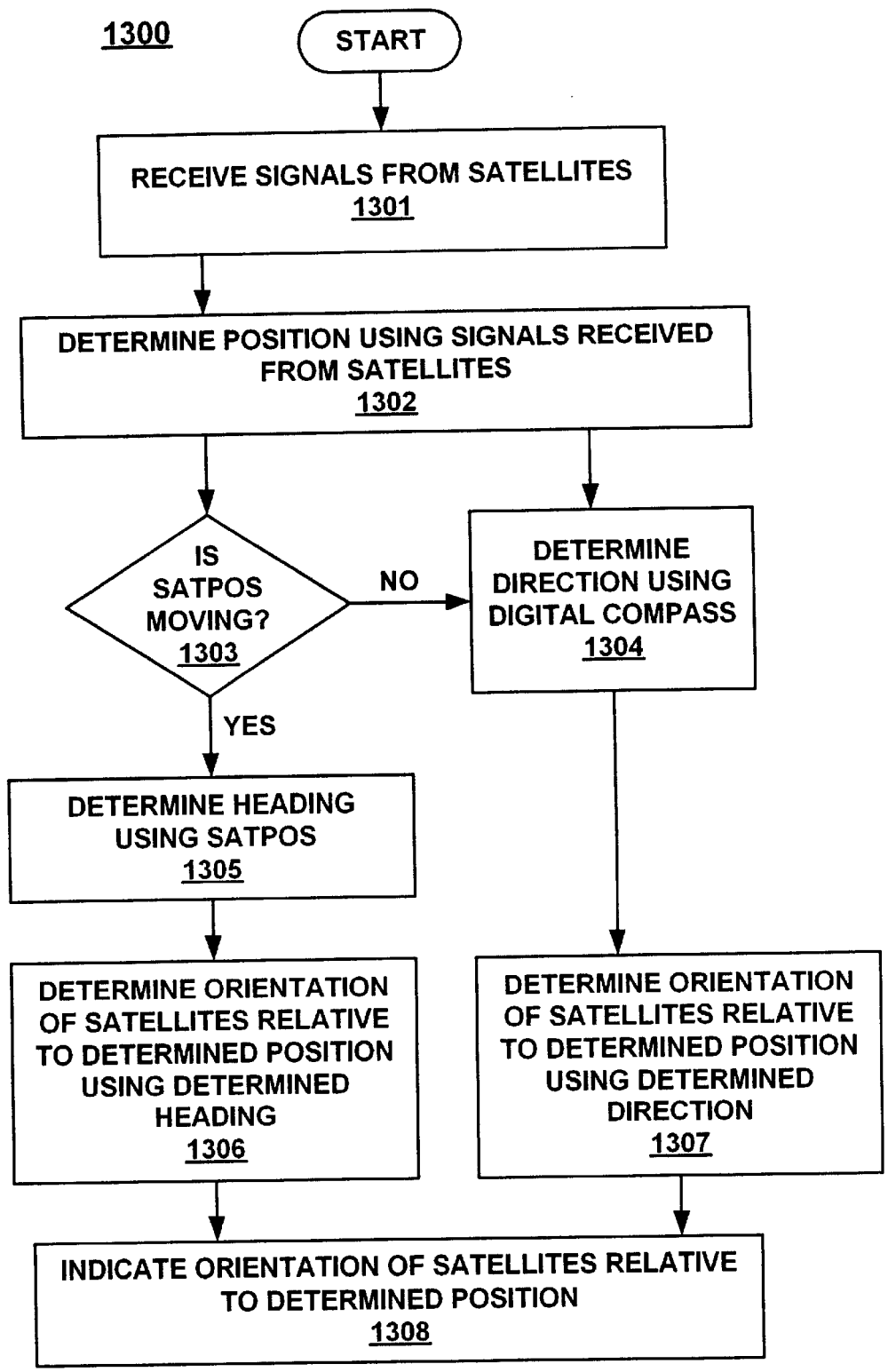
FIG. 13 is a flow chart illustrating a method for generating a skyplot in which both direction and heading are used to orient the skyplot in accordance with one embodiment of the present claimed invention.

FIG. 13 shows a method 1300 for generating a skyplot. First, as shown by step 1301, signals are received from satellites. Position is then determined using the signals received in step 1301. In the present embodiment, SATPOS 3 of FIGS. 1–2 is used for receiving signals from satellites and for determining position.

When the SATPOS is moving, heading is determined as is shown by steps 1303 and 1305. In the present embodiment, SATPOS 3 of FIGS. 1–2 is used for determining heading.

When the SATPOS is not moving, direction is determined as is shown by steps 1303–1304. In the present embodiment, digital compass 4 of FIGS. 1–2 is used for determining direction.

Referring now to step 1306, orientation of the satellites of the skyplot is determined relative to the determined position using the heading determined in step 1305.

The orientation of the satellites of the skyplot are then indicated relative to the determined position as shown by step 1308. In the present embodiment, this indication is in the form of a display that indicates the orientation of the satellites relative to the position determined in step 1302 and relative to the orientation of the position and direction system. The orientation of the satellites is indicated using the orientation determined in step 1306 when the SATPOS is moving, and the orientation of the satellites is indicated using the orientation determined in step 1307 when the SATPOS is not moving.

In the present embodiment, the display is automatically updated upon movement of the position and direction system that corresponds to a change in orientation. Thereby, the skyplot is always displayed in the proper orientation.

Figure 14:
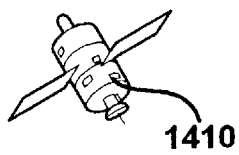
FIG. 14 is a diagram showing an exemplary display of a skyplot in accordance with one embodiment of the present claimed invention.
Figure 14:
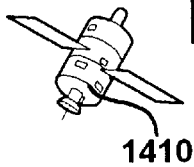
Figure 14:
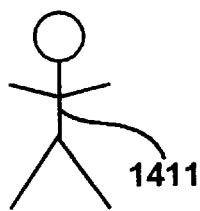
Figure 14:
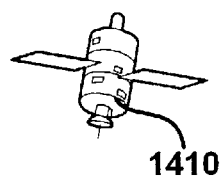
Figure 14:
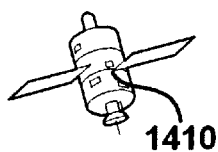
Figure 14:
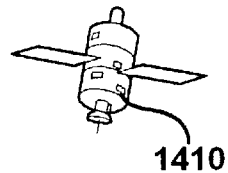

FIG. 14 shows an exemplary display of a skyplot generated in accordance with one of methods 1200 of FIG. 12 or method 1300 of FIG. 13. Satellite icons 1410 illustrate the orientation of satellites relative to the position of the SATPOS (indicated by icon 1411) and relative to the orientation of the position and direction system.

Display 1400 also shows icon 1402 that indicates whether orientation is determined using heading or whether orientation is determined using the digital compass. In the present embodiment, an icon that reads "heading" is displayed when heading is used to determine the orientation of the skyplot and no icon is displayed when direction is used to determine the orientation of the skyplot.

It is appreciated that display 1400 can also be a moving map display that includes the display of some or all of the features shown in FIGS. 7A–9B in addition to the display of satellite icons 1400.

Figure 15:
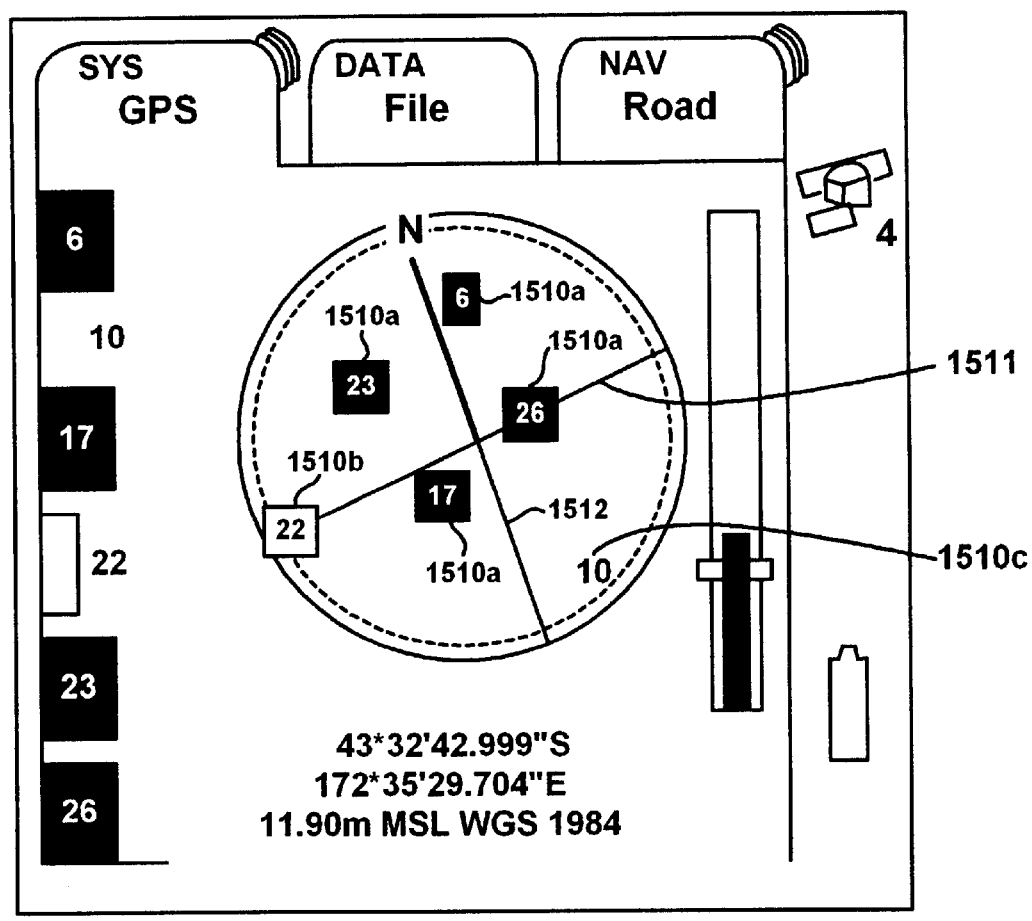
FIG. 15 is a diagram showing an exemplary display that includes a skyplot in accordance with one embodiment of the present claimed invention.

FIG. 15 shows an exemplary display 1500 that includes a skyplot generated in accordance with method 1200 of FIG. 12 or method 1300 of FIG. 13. Satellite icons 1510a–1510c illustrate the orientation of satellites relative to the position of the SATPOS (indicated by the intersection of lines 1511 and 1512) and relative to the orientation of the position and direction system.

In the present embodiment, satellite icons 1510a are displayed as filled geometric shapes, indicating that the position and direction system is currently locked onto signals from each of the satellites represented by satellite icons 1510a and that the signals from satellite icons 1510a are currently being used in the computation of position. Satellite icon 1510b is displayed as an unfilled geometric shape, indicating that the position and direction system is receiving signals from the satellite represented by satellite icon 1510b and that the received signals are not being used in the current determination of position.

Continuing with FIG. 15, when no signal is received from a satellite a numeral representing the satellite is displayed. In the present embodiment, the numeral is not surrounded by a box or a filled geometric shape. Icon 1500c represents a satellite from which no signal is being received. The location of icon 1500c on the display indicates where the satellite should be located relative to the integrated position and direction system. By indicating that no signal is being received from the satellite represented by icon 1500c (because it is represented by an unboxed numeral) and indicating where the satellite represented by icon 1500c should be located, allows a user to quickly locate surface features and/or obstructions that may be blocking reception.

The present invention provides a method and apparatus for providing an accurate skyplot to a user of a SATPOS device that indicates the orientation of the satellites of the skyplot relative to orientation of the position and direction system. Because the satellites of the skyplot are oriented according to the orientation of the integrated position and direction system, the user can easily determine the location of the satellites of the skyplot. Also, the user can easily determine features that are obstructing satellite reception without any need for the user to determine the location of North as is required when using a prior art skyplot display.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An integrated position and direction system comprising:
   a) a satellite positioning system including a receiver to receive satellite position determining signals and a microprocessor for determining position and for determining heading;
   b) a digital compass for determining direction; and
   c) a display coupled to said satellite positioning system and coupled to said digital compass for indicating said heading and said direction, said display operable to indicate the orientation of satellites relative to a determined position and relative to the orientation of said integrated position and direction system, wherein said heading is indicated on said display when said integrated position and direction system is moving and said direction is indicated when said integrated position and direction system is not moving.

2. An integrated position and direction system as recited in claim 1 wherein said indication of the orientation of said satellites includes the display of icons that represent each of said satellites.

3. An integrated position and direction system as recited in claim 1 wherein said indication of the orientation of said satellites includes the display of icons that represent each of said satellites, said icons displayed so as to indicate the orientation of said satellites relative to said determined position and relative to the orientation of said integrated position and direction system.

4. An integrated position and direction system as recited in claim 1 further comprising:
   a housing, said display, said satellite positioning system, and said digital compass disposed in said housing.

5. An integrated position and direction system comprising:
   a) a display;
   b) a satellite positioning system including a receiver to receive position determining signals from satellites;
   c) a digital compass coupled to said satellite positioning system, said digital compass to determine direction; and
   d) a controller for controlling the operations of said satellite positioning system and said digital compass, said controller coupled to said satellite positioning system and coupled to said digital compass and coupled to said display, said controller operable to indicate on said display the orientation of said satellites relative to said determined position and relative to the orientation of said integrated position and direction system, said controller operable to indicate on said display a determined heading when said integrated position and direction system is moving and said direction when said integrated position and direction system is not moving.

6. An integrated position and direction system as recited in claim 5 wherein the position of said satellites is indicated by the display of a plurality of icons visible on said display.

7. An integrated position and direction system as recited in claim 6 further comprising:
   a housing, said display disposed in said housing, said satellite positioning system disposed in said housing, said digital compass disposed in said housing, and said controller disposed in said housing.

8. An integrated position and direction system as recited in claim 7 wherein said housing is suitable for hand held operation.

9. A method for determining orientation of satellites comprising:
   a) determining position using a satellite positioning system that receives position determining signals from satellites;
   b) determining direction using a digital compass when said satellite positioning system is not moving;
   c) determining heading using said satellite positioning system when said satellite positioning system is moving; and
   d) determining the orientation of said satellites relative to said determined position and relative to the orientation of an integrated position and direction system using said direction or said heading, said integrated position and direction system comprises said satellite positioning system and said digital compass.

10. A method as recited in claim 9 further comprising:
    e) indicating on a display the orientation of said satellites relative to said determined position and relative to the orientation of said integrated position and direction system.

11. A method as recited in claim 10 further comprising:
    f) indicating on said display said determined position.

12. A method as recited in claim 9 wherein said integrated position and direction system is suitable for hand held operation.

13. A method as recited in claim 9 wherein said satellites are of a Global Positioning System (GPS).

14. A method as recited in claim 9 further comprising:
    e) indicating on a display said heading when said satellite positioning system is moving and said direction when said satellite positioning system is not moving.

15. A method for determining orientation of satellites comprising:
    a) determining position using a satellite positioning system that receives position determining signals from satellites;
    b) determining heading using said satellite positioning system when said satellite positioning system is moving;
    c) determining direction using a digital compass when said satellite positioning system is not moving; and
    d) determining the orientation of said satellites relative to said determined position and relative to the orientation of an integrated position and direction system using one of said direction and said heading.

16. A method as recited in claim 15 further comprising:
    e) indicating the orientation of said satellites relative to said determined position and relative to the orientation of said integrated position and direction system.

17. A method as recited in claim 16 further comprising:
    f) indicating said determined position.

18. A method as recited in claim 17 further comprising:
    g) utilizing a display coupled to said satellite positioning system and coupled to said digital compass, said orientation of said satellites relative to said determined position and relative to the orientation of said integrated position and direction system indicated on said display.

19. A method as recited in claim 18 wherein a plurality of icons that represent said satellites are displayed on said display.

20. A method as recited in claim 19 wherein an icon that represents said determined position is displayed on said display.

* * * * *